United States Patent
Tseng et al.

(10) Patent No.: US 10,095,323 B1
(45) Date of Patent: Oct. 9, 2018

(54) MOUSE DEVICE (71) Applicant: Cheng Uei Precision Industry Co., Ltd., New Taipei (TW)

(72) Inventors: Chi-Ming Tseng, New Taipei (TW); Yu-Hsiang Ting, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/685,920

(22) Filed: Aug. 24, 2017

(51) Int. Cl.
*G06F 3/0354* (2013.01)
*G06F 3/038* (2013.01)
*G06F 3/023* (2006.01)

(52) U.S. Cl.
CPC .......... *G06F 3/03543* (2013.01); *G06F 3/023* (2013.01); *G06F 3/038* (2013.01); *G06F 2203/0333* (2013.01)

(58) Field of Classification Search
CPC ......... G06F 3/03543; G06F 2203/0333; G06F 3/038; G06F 3/023; G06F 3/04892
See application file for complete search history.

(56) References Cited

U.S. PATENT DOCUMENTS 6,054,978 A * 4/2000 Perry .................. G06F 3/03543
345/163

* cited by examiner

*Primary Examiner* — Sejoon Ahn
(74) *Attorney, Agent, or Firm* — Cheng-Ju Chiang (57) ABSTRACT

A mouse device includes a lower shell, an upper shell mounted to the lower shell, a circuit board and at least one button module. A receiving space is formed between the upper shell and the lower shell. The circuit board is fastened in the receiving space. A front of a top surface of the circuit board is equipped with at least one electronic switch. The at least one button module includes a touch element, a connecting shaft and a torsion spring. The touch element is pivotally connected to a front end of a top of the upper shell. The torsion spring is pivotally mounted around the connecting shaft. The torsion spring has a first spring foot elastically abutting against the top of the upper shell, and at least one second spring foot elastically abutting against a top surface of the touch element.

17 Claims, 9 Drawing Sheets

MOUSE DEVICE

BACKGROUND OF THE INVENTION

1. Field of the Invention

The present invention generally relates to a mouse device, and more particularly to a mouse device capable of keeping a better hand feeling after the mouse device is used for a long time.

2. The Related Art

Currently, with the development of electronic sciences and technologies, electronic products have entered people's daily lives, especially, computers have become essential necessities in the people's daily lives, in order to improve using effects of the computers in work and daily games, mouse devices appear especially important.

Referring to FIG. 6 to FIG. 9, a conventional mouse device 100' includes a lower shell 10', an upper shell 20', a circuit board 30', a button module 40' and a rear cover 50'. The upper shell 20' is mounted to the lower shell 10', so a receiving space (not shown) is formed between the upper shell 20' and the lower shell 10'. The circuit board 30' is fastened in the receiving space. A front of a top surface of the circuit board 30' is equipped with two electronic switches 31' arranged transversely. The upper shell 20' opens two pressing holes 21' communicated with the receiving space and corresponding to the two electronic switches 31', respectively. The button module 40' includes a fastening board 41', two cantilever arms 42' connected with a front end of the fastening board 41' and arranged transversely, and two touch elements 43' fastened to front edges of the two cantilever arms 42' respectively. A bottom surface of each of the two touch elements 43' protrudes downward to form a pressing portion 44'. The fastening board 41' is fastened to a middle of a top surface of the upper shell 20'. The two touch elements 43' are disposed to a front of the top surface of the upper shell 20' and are arranged transversely. The pressing portions 44' of the two touch elements 43' are received in the two pressing holes 21', respectively. The pressing portions 44' of the two touch elements 43' abut against the two corresponding electronic switches 31', respectively. Rears of the lower shell 10' and the upper shell 20' is covered with the rear cover 50', and the two cantilever arms 42' and the fastening board 41' is received in the rear cover 50'.

Figure 8:
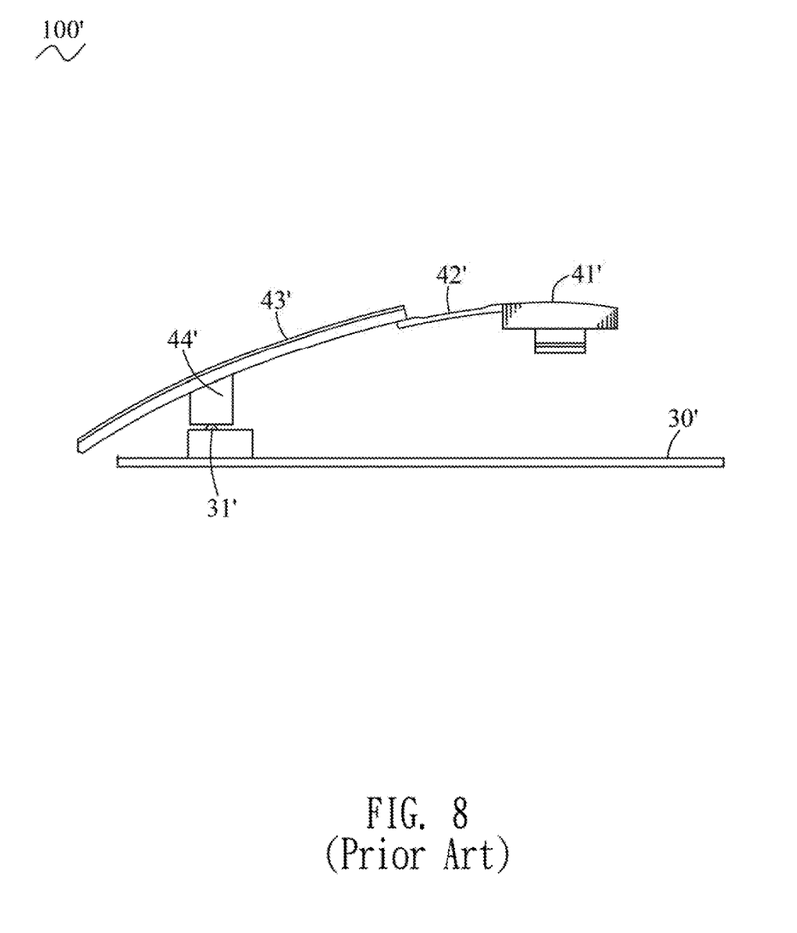
FIG. 8 is a diagrammatic drawing of the conventional mouse device of FIG. 6, wherein a pressing portion abuts against an electronic switch.
Figure 9:
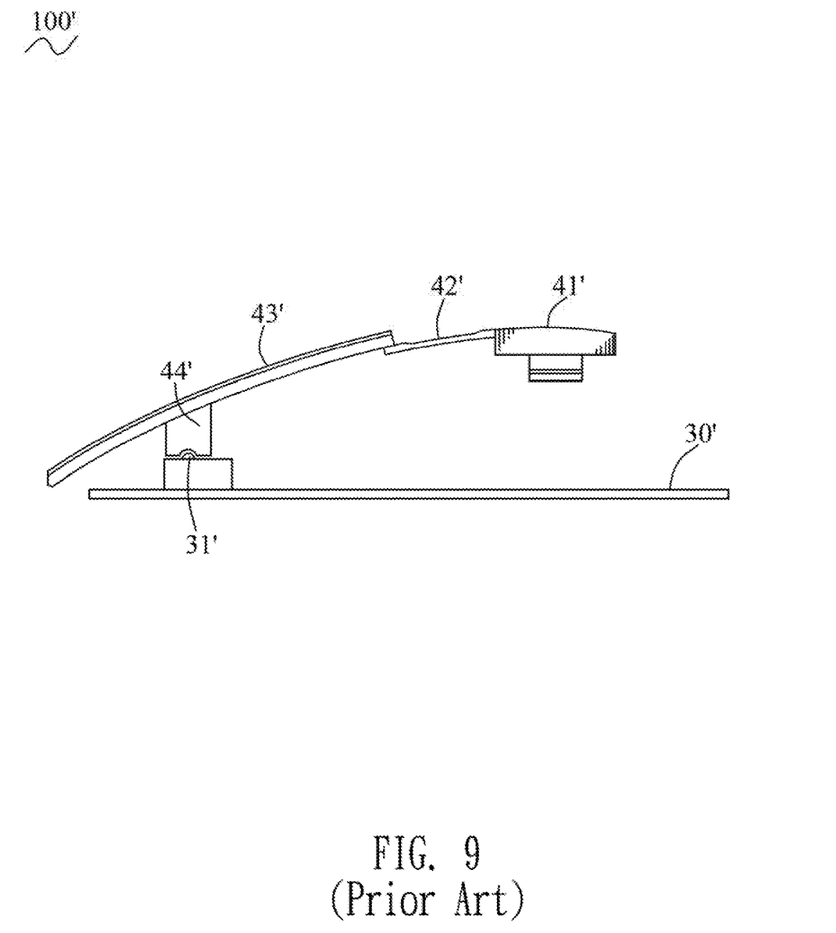
FIG. 9 is a diagrammatic drawing of the conventional mouse device of FIG. 8, wherein the pressing portion is partially abraded after the button module is used for a long time.

However, when pressing forces pressed downward by a user are exerted on the two touch elements 43' of the button module 40', the two touch elements 43' of the button module 40' will move downward, when no pressing forces pressed downward by the user are exerted on the two touch elements 43', the two touch elements 43' will return to original positions, bottom surfaces of the pressing portions 44' just keep contacting with and being without triggering the two electronic switches 31'. After the conventional mouse device 100' is used for a long time, contact points of the pressing portions 44' contacting with the electronic switches 31' will be partially abraded to occur partial abrasion phenomena, when the user uses the conventional mouse device 100', a vacant path will be formed between an abrasion position of each of the pressing portions 44' and one of the electronic switches 31' that makes the conventional mouse device 100' be incapable of keeping a better hand feeling and even out of order in use.

Thus, in order to solve the problem described above, an innovative mouse device need be provided, after the innovative mouse device is used for a long time, though a contact point of a pressing portion of the innovative mouse device contacting with an electronic switch of the innovative mouse device will be partially abraded to occur a partial abrasion phenomenon, a vacant path will be without being formed between an abrasion position of the pressing portion and the electronic switch, so that the innovative mouse device will be still used in order and capable of keeping a better hand feeling in use.

SUMMARY OF THE INVENTION

An object of the present invention is to provide a mouse device capable of keeping a better hand feeling after the mouse device is used for a long time. The mouse device includes a lower shell, an upper shell mounted to the lower shell, a circuit board and at least one button module. A receiving space is formed between the upper shell and the lower shell. The circuit board is fastened in the receiving space. A front of a top surface of the circuit board is equipped with at least one electronic switch. The at least one button module includes a touch element, a connecting shaft and a torsion spring. The touch element is pivotally connected to a front end of a top of the upper shell by virtue of the corresponding connecting shaft. A front of a bottom surface of the touch element protrudes downward towards a front of an inside of the upper shell to form at least one pressing portion corresponding to the at least one electronic switch. The touch element is capable of reciprocating upward and downward relative to the at least one electronic switch. The torsion spring is pivotally mounted around the connecting shaft. The torsion spring has a first spring foot elastically abutting against the top of the upper shell, and at least one second spring foot elastically abutting against a top surface of the touch element. The at least one second spring foot elastically abuts against the top surface of the touch element and exerts a downward pressing force on the touch element by virtue of the first spring foot and the at least one second spring foot acting bending stresses on the upper shell and the touch element respectively, the downward pressing force is smaller than a pressure needed by triggering the at least one electronic switch, so that a bottom surface of the at least one pressing portion abuts against the at least one electronic switch and the at least one electronic switch will be without being triggered.

As described above, the at least one button module is connected with the upper shell by virtue of the torsion spring and the connecting shaft of the at least one button module, the first spring foot of the torsion spring elastically abuts against the top of the fastening board of the upper shell, and the at least one second spring foot of the torsion spring elastically abuts against the top surface of the touch element and exerts the downward pressing force on the touch element by virtue of the first spring foot and the at least one second spring foot of the torsion spring acting the bending stresses on the fastening board of the upper shell and the touch element respectively, the downward pressing force is smaller than the pressure needed by triggering the at least one electronic switch, so that the bottom surface of the at least one pressing portion abuts against the at least one electronic switch and the at least one electronic switch will be without being triggered, after the mouse device is used for a long time, though a contact point of the at least one pressing portion of the mouse device contacting with the at least one electronic switch of the mouse device will be partially abraded to occur a partial abrasion phenomenon, a vacant path will be without being formed between an abrasion position of the at least one pressing portion and the at least one electronic switch, so that the mouse device will be still used in order and capable of keeping a better hand feeling in use.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
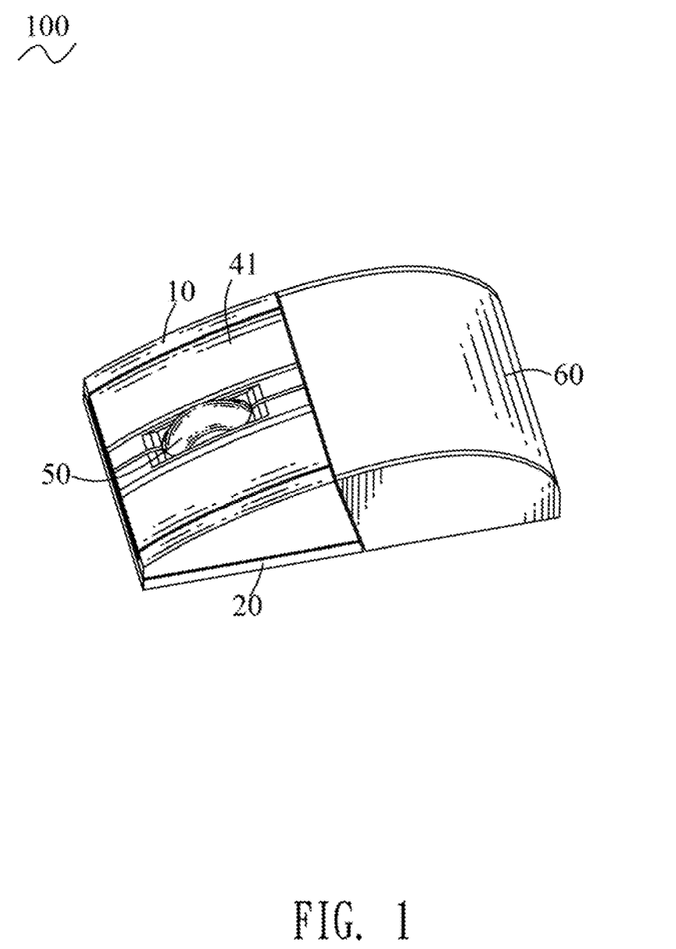
FIG. 1 is a perspective view of a mouse device in accordance with a preferred embodiment of the present invention.
Figure 2:
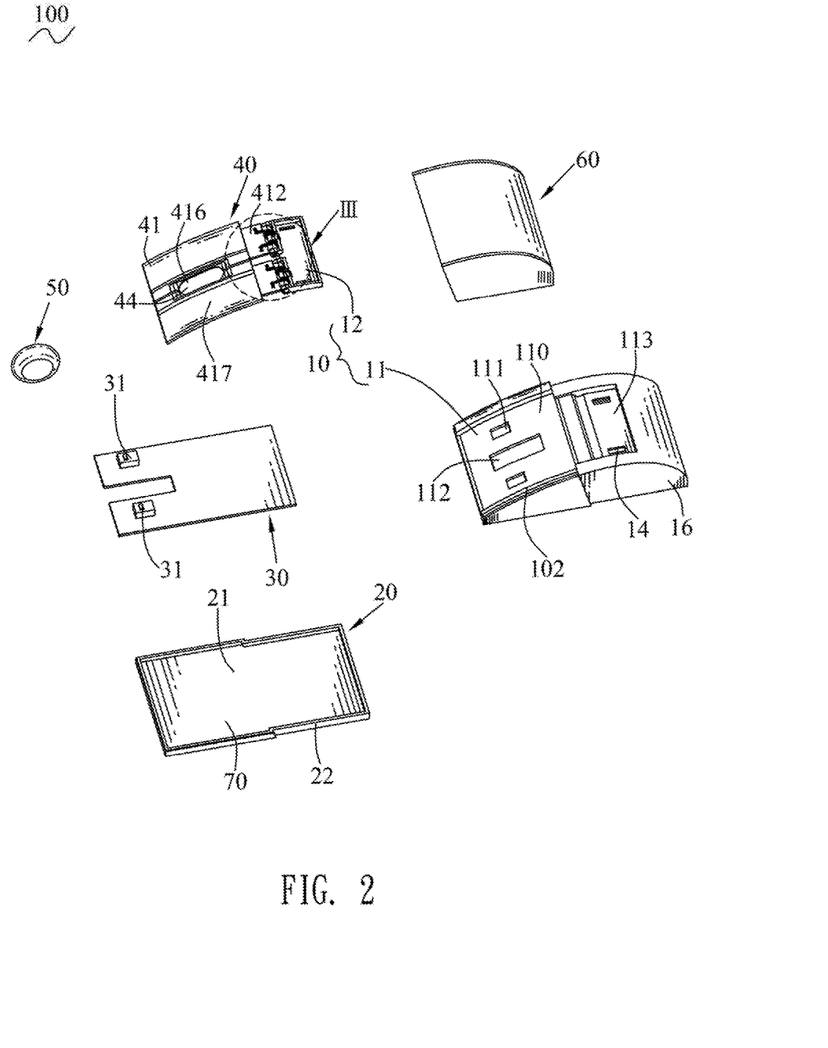
FIG. 2 is an exploded perspective view of the mouse device of FIG. 1.

With reference to FIG. 1 and FIG. 2, a mouse device 100 in accordance with a preferred embodiment of the present invention is shown. The mouse device 100 includes an upper shell 10, a lower shell 20, a circuit board 30, at least one button module 40, a wheel button 50 and a rear cover 60.

Referring to FIG. 1 and FIG. 2 again, the upper shell 10 is mounted to the lower shell 20, and a receiving space 70 is formed between the upper shell 10 and the lower shell 20. The circuit board 30 is fastened in the receiving space 70. A front of a top surface of the circuit board 30 is equipped with at least one electronic switch 31. Specifically, the front of the top surface of the circuit board 30 is equipped with two electronic switches 31 arranged transversely.

Referring to FIG. 2 to FIG. 5, the upper shell 10 includes a shell body 11 and a fastening board 12. The shell body 11 is of a hollow shape. An inside of the shell body 11 defines a first receiving space 15 penetrating through a bottom surface 101 of the shell body 11. A substantial middle of a top wall of the first receiving space 15 is arched upward away from the bottom surface 101 of the shell body 11 to show a substantially arc shape. Correspondingly, the shell body 11 has a top surface 102 of which a substantial middle is arched upward away from the bottom surface 101 of the shell body 11. A front of the top surface 102 of the shell body 11 is recessed inward towards the inside of the shell body 11 to form a locating groove 110. A bottom wall of the locating groove 110 opens at least one pressing hole 111 communicated with the receiving space 70. The at least one pressing hole 111 is corresponding to the at least one electronic switch 31. A middle of the top surface 102 of the shell body 11 is recessed inward towards the inside of the shell body 11 to form a fastening groove 113. The fastening groove 113 is located behind the locating groove 110.

Specifically, a rear of the top surface 102 of the shell body 11 is recessed inward towards the inside of the shell body 11 to form a first assembling groove 16 located behind the locating groove 110. A front of a bottom wall of the first assembling groove 16 is recessed inward towards the inside of the shell body 11 to form the fastening groove 113 located behind the locating groove 110. The bottom wall of the locating groove 110 opens two pressing holes 111 communicated with the receiving space 70 and arranged transversely. The two pressing holes 111 are corresponding to the two electronic switches 31. The bottom wall of the locating groove 110 opens a first wheel hole 112 located between the two pressing holes 111.

The fastening board 12 is fastened in a rear of the fastening groove 113. The shell body 11 defines a buckling hole 14. The fastening board 12 defines a buckling portion 13 matched with the buckling hole 14. When the fastening board 12 is fastened in the rear of the fastening groove 113, the buckling portion 13 passes through and is buckled with the buckling hole 14 to fasten the fastening board 12 in the fastening groove 113. Specifically, two opposite sides of a bottom wall of the fastening groove 113 open two buckling holes 14 communicated with the receiving space 70. Two opposite sides of a bottom surface of the fastening board 12 protrude downward towards the two buckling holes 14 to form two buckling portions 13 matched with the two buckling holes 14, respectively. When the fastening board 12 is fastened in the rear of the fastening groove 113, the two buckling portions 13 pass through and are buckled with the two buckling holes 14 respectively to fasten the fastening board 12 in the fastening groove 113.

A front of the fastening board 12 is connected with at least one group of first fixing portions 121. Specifically, in this preferred embodiment, the front of the fastening board 12 is connected with two groups of the first fixing portions 121 arranged transversely. Each group of the first fixing portions 121 include two first fixing portions 121 spaced from each other and arranged transversely. The two first fixing portions 121 of each group of the first fixing portions 121 open two first fixing holes 122 transversely penetrating through the two first fixing portions 121 of each group of the first fixing portions 121, respectively. A middle of a top surface of the fastening board 12 is recessed downward towards the inside of the shell body 11 to form an indentation 123. A top surface of a front wall 124 of the indentation 123 is recessed downward towards the inside of the shell body 11 to form a notch 125. Specifically, two opposite sides of the top surface of the front wall 124 of the indentation 123 are recessed downward towards the inside of the shell body 11 to form two notches 125. One of the two notches 125 is located between the two first fixing portions 121 of the one group of the first fixing portions 121. The other notch 125 is located between the two first fixing portions 121 of the other group of the first fixing portions 121.

Figure 4:
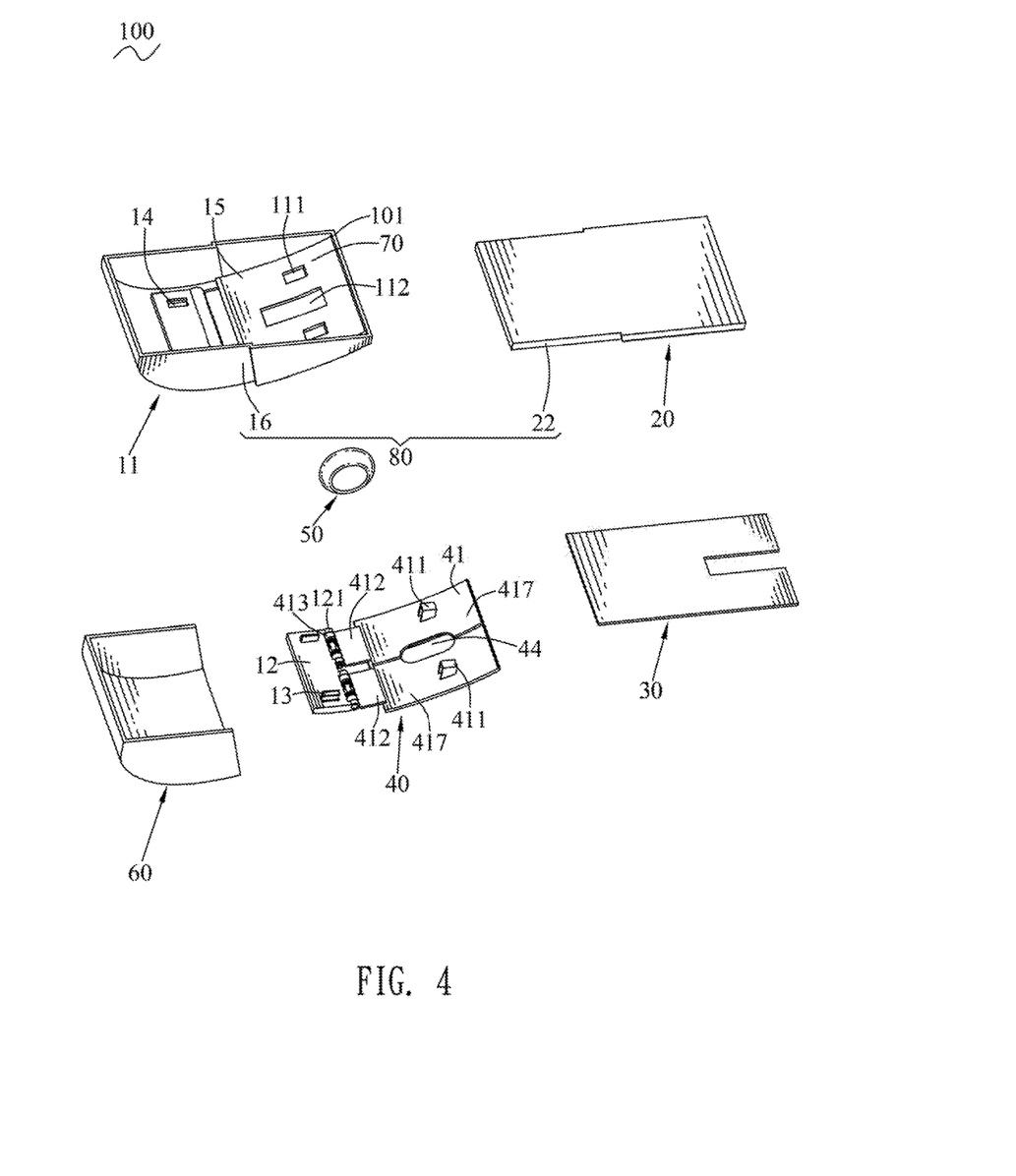
FIG. 4 is another exploded perspective view of the mouse device of FIG. 1.

The lower shell 20 is mounted under the upper shell 10. The lower shell 20 opens a second receiving space 21 penetrating through a middle of a top surface of the lower shell 20. The second receiving space 21 faces to the first receiving space 15. The second receiving space 21 cooperates with the first receiving space 15 to form the receiving space 70. A rear of a peripheral surface of the lower shell 20 is recessed inward towards the second receiving space 21 to form a second assembling groove 22. The second assembling groove 22 is matched with the first assembling groove 16 to form an assembling groove 80.

Referring to FIG. 1 to FIG. 5, the at least one button module 40 includes a touch element 41 matched with the locating groove 110, a connecting shaft 42 and a torsion spring 43. The touch element 41 of the at least one button module 40 is pivotally connected to a front end of a top of the upper shell 10 by virtue of the corresponding connecting shaft 42 of the at least one button module 40. The at least one button module 40 is connected with the upper shell 10 by virtue of the torsion spring 43 and the connecting shaft 42 of the at least one button module 40. The touch element 41 of the at least one button module 40 is capable of reciprocating upward and downward relative to the at least one electronic switch 31. The touch element 41 is assembled in the locating groove 110 and located in front of the fastening board 12. A front of a bottom surface of the touch element 41 protrudes downward towards a front of an inside of the upper shell 10 to form at least one pressing portion 411 corresponding to the at least one electronic switch 31. The at least one pressing portion 411 of the touch element 41 is received in the at least one pressing hole 111. The touch element 41 of the at least one button module 40 has a touch portion 417. The touch portion 417 is located in the locating groove 110. A front of a bottom surface of the touch portion 417 of the touch element 41 of the at least one button module 40 protrudes downward towards the front of the inside of the upper shell 10 to form the at least one pressing portion 411 corresponding to the at least one electronic switch 31. A rear of the bottom surface of the touch portion 417 of the at least one button module 40 extends rearward to form a cantilever arm 412 projecting beyond a rear surface of the touch portion 417. The cantilever arm 412 is corresponding to a front of the fastening groove 113. The cantilever arm 412 is fastened in the front of the fastening groove 113 and located between the touch portion 417 of the touch element 41 and the fastening board 12.

A rear of the cantilever arm 412 protrudes rearward towards the front of the fastening board 12 to form a second fixing portion 413. The second fixing portion 413 of the cantilever arm 412 is corresponding to the two first fixing portions 121 of the at least one group of the first fixing portions 121. The second fixing portion 413 of the cantilever arm 412 opens a second fixing hole 414 transversely penetrating through the second fixing portion 413. The two first fixing portions 121 of the at least one group of the first fixing portions 121 clamp the second fixing portion 413. The second fixing portion 413 is mounted between the two first fixing portions 121. The two first fixing holes 122 of the two first fixing portions 121 of each group of the first fixing portions 121 are corresponding to the second fixing hole 414 of the second fixing portion 413 of the cantilever arm 412. The connecting shaft 42 passes through the second fixing hole 414 of the second fixing portion 413 of the cantilever arm 412 and the two first fixing holes 122 of the two first fixing portions 121 of each group of the first fixing portions 121, so that the cantilever arm 412 is pivotally connected to the fastening board 12 by virtue of the connecting shaft 42.

Two opposite sides of a top surface of the cantilever arm 412 protrude upward and then bent towards opposite directions to form two L-shaped protruding blocks 415. The two L-shaped protruding blocks 415 are symmetrical to each other. The touch element 41 opens a second wheel hole 44 corresponding to the first wheel hole 112. The wheel button 50 is assembled on the circuit board 30. An upper portion of the wheel button 50 is received in the first wheel hole 112 and the second wheel hole 44 and projects beyond a top surface of the touch element 41.

Figure 3:
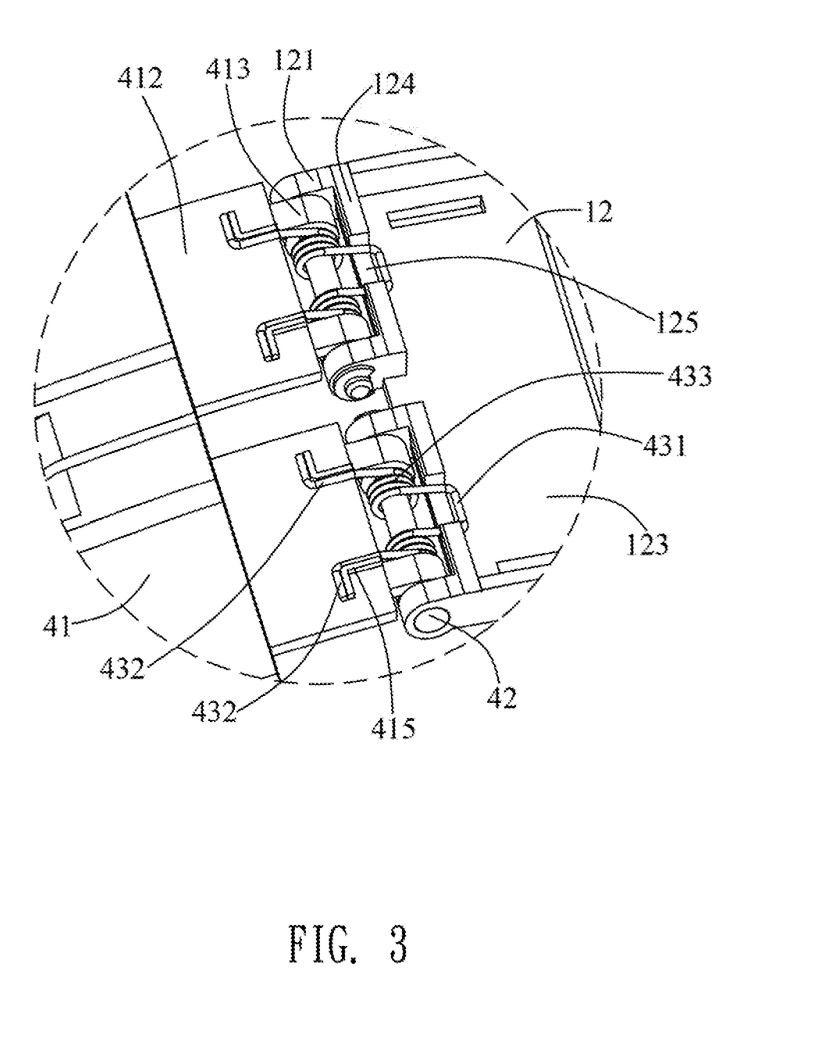
FIG. 3 is an enlarged view of an encircled portion III of the mouse device of FIG. 2.
Figure 5:
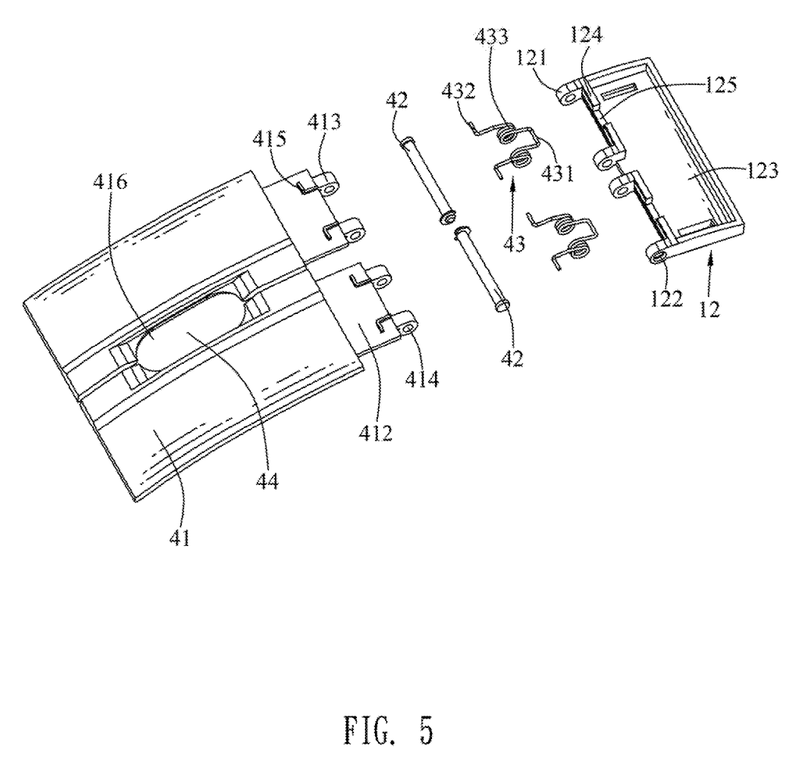
FIG. 5 is an exploded perspective view of a button module and a fastening board of the mouse device of FIG. 1.
Figure 6:
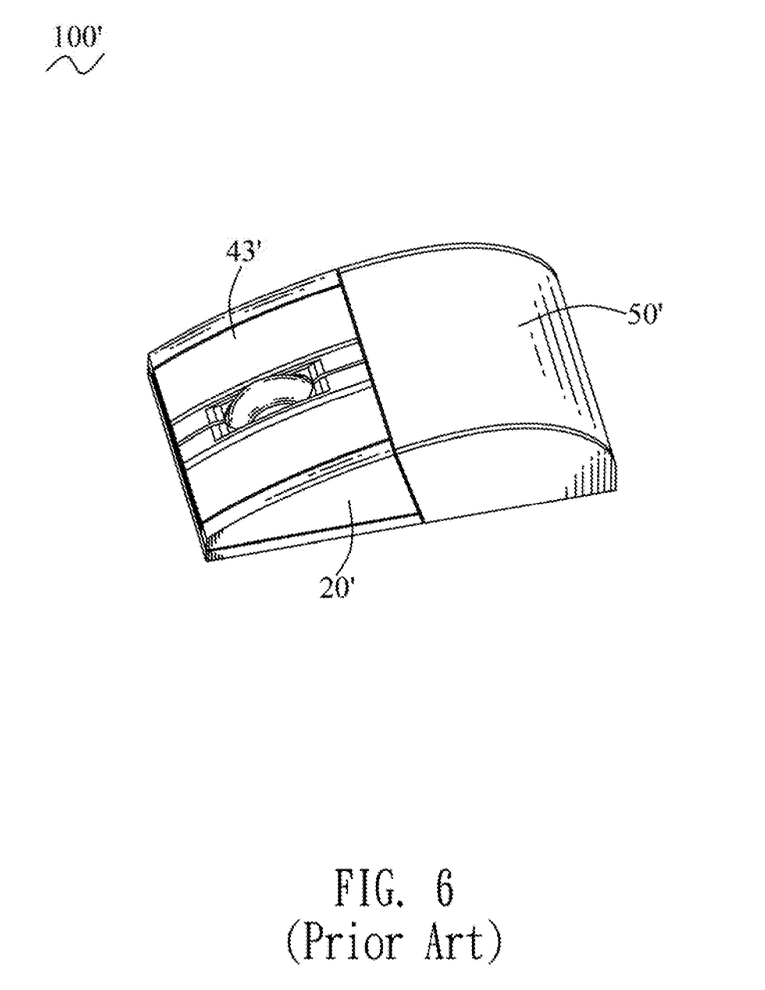
FIG. 6 is a perspective view of a conventional mouse device in prior art.
Figure 7:
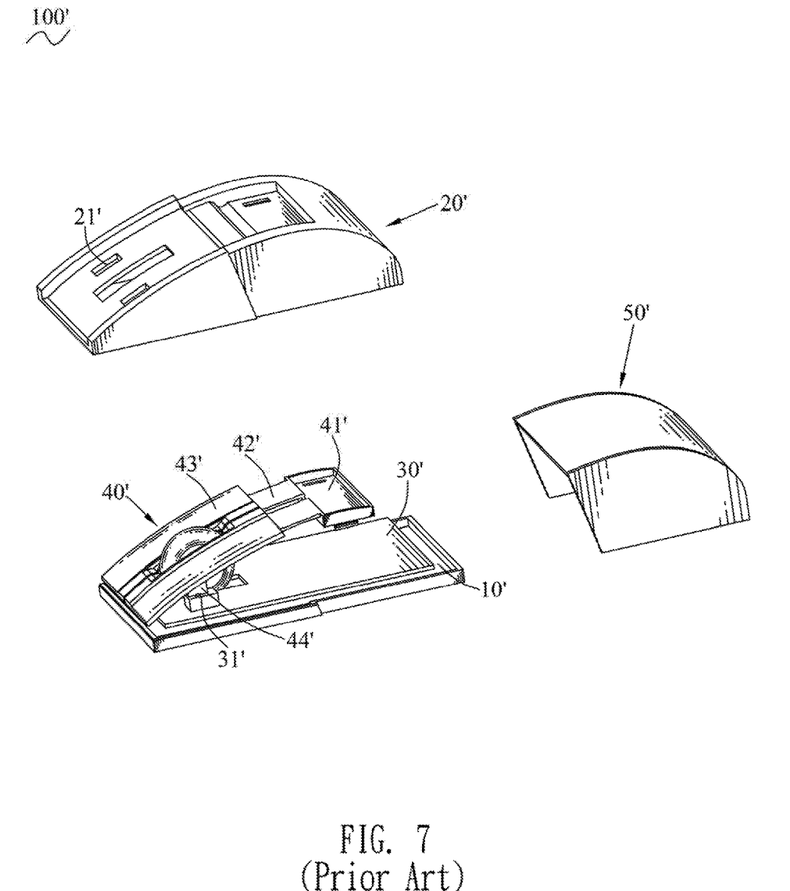
FIG. 7 is an exploded perspective view of the conventional mouse device of FIG. 6.

Referring to FIG. 2, FIG. 3 and FIG. 5, the torsion spring 43 of the at least one button module 40 is pivotally mounted around the connecting shaft 42. The torsion spring 43 has a first spring foot 431 and at least one second spring foot 432. The first spring foot 431 of the torsion spring 43 elastically abuts against the top of the upper shell 10. The first spring foot 431 of the torsion spring 43 elastically abuts against a top of the fastening board 12 of the upper shell 10. The at least one second spring foot 432 of the torsion spring 43 elastically abuts against the top surface of the cantilever arm 412. The at least one second spring foot 432 of the torsion spring 43 elastically abuts against the top surface of the touch element 41 and exerts a downward pressing force on the touch element 41 by virtue of the first spring foot 431 and the at least one second spring foot 432 of the torsion spring 43 acting bending stresses on the fastening board 12 of the upper shell 10 and the cantilever arm 412 of the touch element 41 respectively. The downward pressing force is smaller than a pressure needed by triggering the at least one electronic switch 31, so that a bottom surface of the at least one pressing portion 411 abuts against the at least one electronic switch 31 and the at least one electronic switch 31 will be without being triggered.

Referring to FIG. 3, in this preferred embodiment, the torsion spring 43 is a double twist spring. The torsion spring 43 has two spaced spring bodies 433, and the first spring foot 431 connected between the two spaced spring bodies 433. Tail ends of the two spring bodies 433 of the torsion spring 43 extend frontward towards the rear surface of the touch portion 417 of the touch element 41 and then extend outward towards different directions to form two second spring feet 432. The two spring bodies 433 of the torsion spring 43 are worn around the connecting shaft 42. The first spring foot 431 of the torsion spring 43 is disposed in the notch 125. The two second spring feet 432 of the torsion spring 43 elastically abut against the top surface of the cantilever arm 412. The two second spring feet 432 of the torsion spring 43 elastically abut against the top surface of the touch element 41 and exert a downward pressing force on the touch element 41 by virtue of the first spring foot 431 and the two second spring feet 432 of the torsion spring 43 acting bending stresses on the fastening board 12 of the upper shell 10 and the cantilever arm 412 of the touch element 41 respectively. The two second spring feet 432 abut against the top surface of the cantilever arm 412, and abut against two facing surfaces of the two protruding blocks 415 and two front surfaces of the two protruding blocks 415 facing the rear surface of the touch portion 417 of the touch element 41. The two protruding blocks 415 play a role of fastening the two second spring feet 432.

Referring to FIG. 1 to FIG. 5, in this preferred embodiment, the mouse device 100 includes two button modules 40. Each of the two button modules 40 includes the touch element 41 matched with the locating groove 110, the connecting shaft 42 and the torsion spring 43. The two touch elements 41 of the two button modules 40 are pivotally connected to the front end of the top of the upper shell 10 by virtue of the corresponding connecting shafts 42 of the two button modules 40. The two button modules 40 are connected with the upper shell 10 by virtue of the torsion springs 43 and the connecting shafts 42 of the two button modules 40. The two touch elements 41 are arranged transversely. The two touch elements 41 are capable of reciprocating upward and downward relative to the two electronic switches 31, respectively. The touch elements 41 of the two button modules 40 are assembled in the locating groove 110 and arranged transversely. The touch elements 41 of the two button modules 40 are located in front of the fastening board 12.

The fronts of the bottom surfaces of the touch elements 41 of the two button modules 40 protrude downward towards the inside of the shell body 11 to form two pressing portions 411 corresponding to the two electronic switches 31, respectively. The two pressing portions 411 of the two touch elements 41 are received in the two pressing holes 111, respectively. The touch element 41 of each of the two button modules 40 has the touch portion 417. The touch portion 417 of each of the two button modules 40 is located in the locating groove 110. Fronts of bottom surfaces of the touch portions 417 of the two touch elements 41 of the two button modules 40 protrude downward towards the front of the inside of the upper shell 10 to form two pressing portions 411 corresponding to the two electronic switches 31, respectively. Rears of bottom surfaces of the touch portions 417 of the touch elements 41 of the two button modules 40 extend rearward to form two cantilever arms 412 projecting beyond rear surfaces of the touch portions 417 of the two touch elements 41, respectively. The two cantilever arms 412 are corresponding to the front of the fastening groove 113. The two cantilever arms 412 are fastened in the front of the fastening groove 113 and located between the touch portions 417 of the two touch elements 41 and the fastening board 12.

Two opposite sides of a rear of each of the two cantilever arms 412 protrude rearward towards the front of the fastening board 12 to form two second fixing portions 413 spaced from each other and arranged transversely. The two second fixing portions 413 of one of the two cantilever arms 412 is corresponding to and mounted between the two first fixing portions 121 of one group of the first fixing portions 121. The two second fixing portions 413 of the other cantilever arm 412 is corresponding to and mounted between the two first fixing portions 121 of the other group of the first fixing portions 121. The two second fixing portions 413 of each of the two cantilever arms 412 open two second fixing holes 414 transversely penetrating through the two second fixing portions 413 of each of the two cantilever arms 412. An interval between the two second fixing portions 413 of the one of the two cantilever arms 412 is narrower than an interval between the two first fixing portions 121 of the one group of the first fixing portions 121. An interval between the two second fixing portions 413 of the other cantilever arm 412 is narrower than an interval between the two first fixing portions 121 of the other group of the first fixing portions 121.

The two first fixing holes 122 of the one group of the two first fixing portions 121 are corresponding to the two second fixing holes 414 of the two second fixing portions 413 of the one of the two cantilever arms 412. The two first fixing holes 122 of the other group of the two first fixing portions 121 are corresponding to the two second fixing holes 414 of the two second fixing portions 413 of the other cantilever arm 412. One of the connecting shafts 42 passes through the two second fixing holes 414 of the two second fixing portions 413 of the one of the two cantilever arms 412 and the two first fixing holes 122 of the one group of the two first fixing portions 121, and the other connecting shaft 42 passes through the two second fixing holes 414 of the two second fixing portions 413 of the other cantilever arm 412 and the two first fixing holes 122 of the other group of the two first fixing portions 121, so that the two cantilever arms 412 are pivotally connected to the fastening board 12 by virtue of the connecting shafts 42 of the two button modules 40.

Two opposite sides of a top surface of each of the two cantilever arms 412 protrude upward and then bent towards opposite directions to form the two L-shaped protruding blocks 415. The two L-shaped protruding blocks 415 are symmetrical to each other. The two facing surfaces of the two L-shaped protruding blocks 415 of the one of the two cantilever arms 412 are disposed between two facing surfaces of the two second fixing portions 413 of the one of the two cantilever arms 412. The two facing surfaces of the two L-shaped protruding blocks 415 of the other cantilever arm 412 are disposed between two facing surfaces of the two second fixing portions 413 of the other cantilever arm 412. A junction between the two touch elements 41 of the two button modules 40 opens the second wheel hole 44 corresponding to the first wheel hole 112. Specifically, two adjacent sides of the two touch elements 41 of the two button modules 40 open two symmetrical openings 416. The two symmetrical openings 416 are communicated with and cooperate with each other to form the second wheel hole 44. The wheel button 50 is assembled on the circuit board 30. The upper portion of the wheel button 50 is received in the first wheel hole 112 and the second wheel hole 44 and projects beyond top surfaces of the two touch elements 41 of the two button modules 40.

Referring to FIG. 2 to FIG. 5, the torsion springs 43 of the two button modules 40 are pivotally mounted around the connecting shafts 42 of the two button modules 40, respectively. Each of the torsion springs 43 of the two button modules 40 has the first spring foot 431 and the at least one second spring foot 432. The first spring foot 431 of each of the torsion springs 43 of the two button modules 40 is disposed in one of the two notches 125. The first spring foot 431 of each of the torsion springs 43 of the two button modules 40 elastically abuts against the top of the upper shell 10. The first spring foot 431 of each of the two torsion springs 43 of the two button modules 40 elastically abuts against the top surface of the fastening board 12 of the upper shell 10. The at least one second spring foot 432 of each of the two torsion springs 43 of the two button modules 40 elastically abuts against a top surface of the one of the two cantilever arms 412. The at least one second spring foot 432 of each of the two torsion springs 43 elastically abuts against a top surface of one of the two touch elements 41 and exerts a downward pressing force on the one of the touch elements 41 by virtue of the first spring foot 431 and the at least one second spring foot 432 of each of the two torsion springs 43 acting bending stresses on the fastening board 12 of the upper shell 10 and the one of the two cantilever arms 412 of the two touch elements 41 respectively.

In this preferred embodiment, each of the torsion springs 43 of the two button modules 40 is the double twist spring. Each of the torsion springs 43 of the two button modules 40 has the two spaced spring bodies 433, and the first spring foot 431 connected between the two spaced spring bodies 433. The tail ends of the two spring bodies 433 of each of the torsion springs 43 of the two button modules 40 extend frontward towards the rear surfaces of the touch portions 417 of the touch elements 41 of the two button modules 40 and then extend outward towards the different directions to form the two second spring feet 432. The spring bodies 433 of the torsion springs 43 of the two button modules 40 are worn around the two connecting shafts 42, respectively. The two first spring feet 431 of the torsion springs 43 of the two button modules 40 are disposed in the two notches 125, respectively. The two first spring feet 431 of the two torsion springs 43 elastically abut against the top of the upper shell 10. The two first spring feet 431 of the two torsion springs 43 elastically abut against the top surface of the fastening board 12 of the upper shell 10.

The second spring feet 432 of the torsion springs 43 of the two button modules 40 elastically abut against the top surfaces of the two cantilever arms 412, respectively. The second spring feet 432 of the torsion springs 43 of the two button modules 40 elastically abut against the top surfaces of the two touch elements 41 and exert a downward pressing force on the touch elements 41 of the two button modules 40 by virtue of the two first spring feet 431 and the second spring feet 432 of the two torsion springs 43 acting bending stresses on the fastening board 12 of the upper shell 10 and the two cantilever arms 412 of the touch elements 41 of the two button modules 40, respectively. The downward pressing force is smaller than the pressure needed by triggering the two electronic switches 31, so that the bottom surfaces of the two pressing portions 411 abut against the two electronic switches 31, respectively and the two electronic switches 31 will be without being triggered.

Referring to FIG. 2 to FIG. 5, the two second spring feet 432 of the torsion spring 43 of one of the two button modules 40 abut against the two facing surfaces of the two protruding blocks 415 of the one of the two cantilever arms 412 and two front surfaces of the two protruding blocks 415 of the one of the two cantilever arms 412 facing the rear surfaces of the touch portions 417 of the touch elements 41 of the two button modules 40, respectively. The two second spring feet 432 of the torsion spring 43 of the other button module 40 abut against the two facing surfaces of the two protruding blocks 415 of the other cantilever arm 412 and two front surfaces of the two protruding blocks 415 of the other cantilever arm 412 facing the rear surfaces of the touch portions 417 of the touch elements 41 of the two button modules 40, respectively. The two protruding blocks 415 of each of the two cantilever arms 412 play the role of fastening the two second spring feet 432 of each of the two torsion springs 43.

Referring to FIG. 1, FIG. 2 and FIG. 4, the rear cover 60 is covered to rears of the lower shell 20 and the shell body 11, and the cantilever arm 412 of the at least one button module 40 and the fastening board 12 are mounted in the rear cover 60. Specifically, the two cantilever arms 412 of the two button modules 40 and the fastening board 12 are mounted in the rear cover 60. The rear cover 60 is assembled in the assembling groove 80.

As described above, the at least one button module 40 is connected with the upper shell 10 by virtue of the torsion spring 43 and the connecting shaft 42 of the at least one button module 40, the first spring foot 431 of the torsion spring 43 elastically abuts against the top of the fastening board 12 of the upper shell 10, and the at least one second spring foot 432 of the torsion spring 43 elastically abuts against the top surface of the cantilever arm 412, the at least one second spring foot 432 of the torsion spring 43 elastically abuts against the top surface of the touch element 41 and exerts the downward pressing force on the touch element 41 by virtue of the first spring foot 431 and the at least one second spring foot 432 of the torsion spring 43 acting the bending stresses on the fastening board 12 of the upper shell 10 and the cantilever arm 412 of the touch element 41 respectively, the downward pressing force is smaller than the pressure needed by triggering the at least one electronic switch 31, so that the bottom surface of the at least one pressing portion 411 abuts against the at least one electronic switch 31 and the at least one electronic switch 31 will be without being triggered, after the mouse device 100 is used for a long time, though a contact point of the at least one pressing portion 411 of the mouse device 100 contacting with the at least one electronic switch 31 of the mouse device 100 will be partially abraded to occur a partial abrasion phenomenon, a vacant path will be without being formed between an abrasion position of the at least one pressing portion 411 and the at least one electronic switch 31, so that the mouse device 100 will be still used in order and capable of keeping a better hand feeling in use.

What is claimed is:

1. A mouse device, comprising: a lower shell; an upper shell mounted to the lower shell, and a receiving space being formed between the upper shell and the lower shell; a circuit board fastened in the receiving space, a front of a top surface of the circuit board being equipped with at least one electronic switch; and at least one button module including a touch element, a connecting shaft and a torsion spring, the touch element being pivotally connected to a front end of a top of the upper shell by virtue of the corresponding connecting shaft, a front of a bottom surface of the touch element protruding downward towards a front of an inside of the upper shell to form at least one pressing portion corresponding to the at least one electronic switch, the touch element being capable of reciprocating upward and downward relative to the at least one electronic switch, the torsion spring being pivotally mounted around the connecting shaft, the torsion spring having a first spring foot elastically abutting against the top of the upper shell, and at least one second spring foot elastically abutting against a top surface of the touch element; wherein the at least one second spring foot elastically abuts against the top surface of the touch element and exerts a downward pressing force on the touch element by virtue of the first spring foot and the at least one second spring foot acting bending stresses on the upper shell and the touch element respectively, the downward pressing force is smaller than a pressure needed by triggering the at least one electronic switch, so that a bottom surface of the at least one pressing portion abuts against the at least one electronic switch and the at least one electronic switch will be without being triggered; wherein the upper shell includes a shell body and a fastening board, a middle of a top surface of the shell body is recessed inward towards an inside of the shell body to form a fastening groove, the fastening board is fastened in a rear of the fastening groove; wherein the touch element of the at least one button module has a touch portion, a rear of a bottom surface of the touch portion extends rearward to form a cantilever arm projecting beyond a rear surface of the touch portion, the cantilever arm is pivotally connected to the fastening board by virtue of the connecting shaft, the first spring foot elastically abuts against a top of the fastening board, the at least one second spring foot elastically abuts against a top surface of the cantilever arm; and wherein a front of the fastening board is connected with at least one group of first fixing portions, each group of the first fixing portions include two first fixing portions spaced from each other and arranged transversely, the two first fixing portions open two first fixing holes transversely penetrating through the two first fixing portions, respectively, a rear of the cantilever arm protrudes rearward towards the front of the fastening board to form a second fixing portion corresponding to the two first fixing portions, the second fixing portion opens a second fixing hole transversely penetrating through the second fixing portion, the second fixing portion is mounted between the two first fixing portions, the two first fixing holes are corresponding to the second fixing hole, the connecting shaft passes through the second fixing hole and the two first fixing holes, so that the cantilever arm is pivotally connected to the fastening board by virtue of the connecting shaft.

2. The mouse device as claimed in claim 1, wherein a middle of a top surface of the fastening board is recessed downward towards the inside of the shell body to form an indentation, a top surface of a front wall of the indentation is recessed downward towards the inside of the shell body to form a notch, the torsion spring is a double twist spring which has two spaced spring bodies, and the first spring foot connected between the two spring bodies, tail ends of the two spring bodies extend frontward towards the rear surface of the touch portion and then extend outward towards different directions to form two second spring feet, two opposite sides of the top surface of the cantilever arm protrude upward and then bent towards opposite directions to form two L-shaped protruding blocks, the two spring bodies are worn around the connecting shaft, the first spring foot is disposed in the notch, the two second spring feet abut against the top surface of the cantilever arm, and abut against two facing surfaces of the two protruding blocks and two front surfaces of the two protruding blocks facing the rear surface of the touch portion.

3. A mouse device, comprising: a lower shell; an upper shell mounted to the lower shell, and a receiving space being formed between the upper shell and the lower shell; a circuit board fastened in the receiving space, a front of a top surface of the circuit board being equipped with at least one electronic switch; and at least one button module including a touch element, a connecting shaft and a torsion spring, the touch element being pivotally connected to a front end of a top of the upper shell by virtue of the corresponding connecting shaft, a front of a bottom surface of the touch element protruding downward towards a front of an inside of the upper shell to form at least one pressing portion corresponding to the at least one electronic switch, the touch element being capable of reciprocating upward and downward relative to the at least one electronic switch, the torsion spring being pivotally mounted around the connecting shaft, the torsion spring having a first spring foot elastically abutting against the top of the upper shell, and at least one second spring foot elastically abutting against a top surface of the touch element; wherein the at least one second spring foot elastically abuts against the top surface of the touch element and exerts a downward pressing force on the touch element by virtue of the first spring foot and the at least one second spring foot acting bending stresses on the upper shell and the touch element respectively, the downward pressing force is smaller than a pressure needed by triggering the at least one electronic switch, so that a bottom surface of the at least one pressing portion abuts against the at least one electronic switch and the at least one electronic switch will be without being triggered;

wherein the upper shell includes a shell body and a fastening board, a middle of a top surface of the shell body is recessed inward towards an inside of the shell body to form a fastening groove, the fastening board is fastened in a rear of the fastening groove; wherein the touch element of the at least one button module has a touch portion, a rear of a bottom surface of the touch portion extends rearward to form a cantilever arm projecting beyond a rear surface of the touch portion, the cantilever arm is pivotally connected to the fastening board by virtue of the connecting shaft, the first spring foot elastically abuts against a top of the fastening board, the at least one second spring foot elastically abuts against a top surface of the cantilever arm; and wherein a front of the top surface of the shell body is recessed inward towards the inside of the shell body to form a locating groove, the fastening groove is located behind the locating groove, a bottom wall of the locating groove opens at least one pressing hole communicated with the receiving space, the touch element is assembled in the locating groove and located in front of the fastening board, the at least one pressing portion is received in the at least one pressing hole, the touch portion is located in the locating groove.

4. The mouse device as claimed in claim 3, further comprising a wheel button assembled on the circuit board, the bottom wall of the locating groove opening a first wheel hole, the touch element opening a second wheel hole corresponding to the first wheel hole, an upper portion of the wheel button being received in the first wheel hole and the second wheel hole and projecting beyond the top surface of the touch element.

5. The mouse device as claimed in claim 1, further comprising a rear cover covered to rears of the lower shell and the shell body, and the cantilever arm of the at least one button module and the fastening board being mounted in the rear cover.

6. The mouse device as claimed in claim 5, wherein a rear of the top surface of the shell body is recessed inward towards the inside of the shell body to form a first assembling groove, the lower shell opens a second receiving space penetrating through a middle of a top surface of the lower shell, a rear of a peripheral surface of the lower shell is recessed inward towards the second receiving space to form a second assembling groove, the second assembling groove is matched with the first assembling groove to form an assembling groove, the rear cover is assembled in the assembling groove.

7. The mouse device as claimed in claim 6, wherein an inside of the shell body defines a first receiving space penetrating through a bottom surface of the shell body, the second receiving space faces to the first receiving space, the second receiving space cooperates with the first receiving space to form the receiving space.

8. The mouse device as claimed in claim 1, wherein the shell body defines a buckling hole, the fastening board defines a buckling portion matched with the buckling hole, when the fastening board is fastened in the rear of the fastening groove, the buckling portion passes through and is buckled with the buckling hole to fasten the fastening board in the fastening groove.

9. The mouse device as claimed in claim 8, wherein two opposite sides of a bottom wall of the fastening groove open two buckling holes communicated with the receiving space, two opposite sides of a bottom surface of the fastening board protrude downward towards the two buckling holes to form two buckling portions matched with the two buckling holes, respectively, when the fastening board is fastened in the rear of the fastening groove, the two buckling portions pass through and are buckled with the two buckling holes respectively to fasten the fastening board in the fastening groove.

10. The mouse device as claimed in claim 1, wherein the mouse device includes two button modules of which each includes the touch element, the connecting shaft and the torsion spring, the touch element of each of the two button modules has a touch portion, rears of bottom surfaces of the touch portions of the touch elements of the two button modules extend rearward to form two cantilever arms projecting beyond rear surfaces of the touch portions of the two touch elements, respectively, the two cantilever arms are pivotally connected to the fastening board by virtue of the connecting shafts of the two button modules, the first spring foot of each of the two torsion springs of the two button modules elastically abuts against a top surface of the fastening board, the at least one second spring foot of each of the two torsion springs of the two button modules elastically abuts against a top surface of one of the two cantilever arms.

11. A mouse device, comprising: a lower shell; an upper shell mounted to the lower shell, and a receiving space being formed between the upper shell and the lower shell; a circuit board fastened in the receiving space, a front of a top surface of the circuit board being equipped with at least one electronic switch; and at least one button module including a touch element, a connecting shaft and a torsion spring, the touch element being pivotally connected to a front end of a top of the upper shell by virtue of the corresponding connecting shaft, a front of a bottom surface of the touch element protruding downward towards a front of an inside of the upper shell to form at least one pressing portion corresponding to the at least one electronic switch, the touch element being capable of reciprocating upward and downward relative to the at least one electronic switch, the torsion spring being pivotally mounted around the connecting shaft, the torsion spring having a first spring foot elastically abutting against the top of the upper shell, and at least one second spring foot elastically abutting against a top surface of the touch element; wherein the at least one second spring foot elastically abuts against the top surface of the touch element and exerts a downward pressing force on the touch element by virtue of the first spring foot and the at least one second spring foot acting bending stresses on the upper shell and the touch element respectively, the downward pressing force is smaller than a pressure needed by triggering the at least one electronic switch, so that a bottom surface of the at least one pressing portion abuts against the at least one electronic switch and the at least one electronic switch will be without being triggered; wherein the upper shell includes a shell body and a fastening board, a middle of a top surface of the shell body is recessed inward towards an inside of the shell body to form a fastening groove, the fastening board is fastened in a rear of the fastening groove; wherein the mouse device includes two button modules of which each includes the touch element, the connecting shaft and the torsion spring, the touch element of each of the two button modules has a touch portion, rears of bottom surfaces of the touch portions of the touch elements of the two button modules extend rearward to form two cantilever arms projecting beyond rear surfaces of the touch portions of the two touch elements, respectively, the two cantilever arms are pivotally connected to the fastening board by virtue of the connecting shafts of the two button modules, the first spring foot of each of the two torsion springs of the two button modules elastically abuts against a top surface of the fastening board, the at least one second spring foot of each of the two torsion springs of the two button modules elastically abuts against a top surface of one of the two cantilever arms; and wherein the two touch elements of the two button modules are pivotally connected to the front end of the top of the upper shell by virtue of the corresponding connecting shafts of the two button modules, the front of the top surface of the circuit board is equipped with two electronic switches arranged transversely, the fronts of the bottom surfaces of the two touch elements protrude downward towards the inside of the shell body to form two pressing portions corresponding to the two electronic switches, respectively, the touch elements of the two button modules are capable of reciprocating upward and downward relative to the two electronic switches, respectively, the torsion springs of the two button modules are pivotally mounted around the connecting shafts of the two button modules, respectively, each of the torsion springs of the two button modules has the first spring foot elastically abutting against the top of the upper shell, and the at least one second spring foot elastically abutting against a top surface of one of the two touch elements.

12. The mouse device as claimed in claim 11, wherein a front of the fastening board is connected with two groups of the first fixing portions arranged transversely, each group of the first fixing portions include two first fixing portions spaced from each other and arranged transversely, the two first fixing portions open two first fixing holes transversely penetrating through the two first fixing portions, respectively, two opposite sides of a rear of each of the two cantilever arms protrude rearward towards the front of the fastening board to form two second fixing portions spaced from each other and arranged transversely, the two second fixing portions open two second fixing holes transversely penetrating through the two second fixing portions, the two second fixing portions of the one of the two cantilever arms is corresponding to and mounted between the two first fixing portions of one group of the first fixing portions, the two second fixing portions of the other cantilever arm is corresponding to and mounted between the two first fixing portions of the other group of the first fixing portions, one of the connecting shafts passes through the two second fixing holes of the one of the two cantilever arms and the two first fixing holes of the one group of the two first fixing portions, and the other connecting shaft passes through the two second fixing holes of the other cantilever arm and the two first fixing holes of the other group of the two first fixing portions, so that the two cantilever arms are pivotally connected to the fastening board by virtue of the connecting shafts of the two button modules.

13. The mouse device as claimed in claim 11, wherein a middle of a top surface of the fastening board is recessed downward towards the inside of the shell body to form an indentation, two opposite sides of a top surface of a front wall of the indentation are recessed downward towards the inside of the shell body to form two notches, each of the torsion springs of the two button modules is a double twist spring, each of the torsion springs of the two button modules has two spaced spring bodies, and the first spring foot connected between the two spring bodies, tail ends of the two spring bodies of each of the torsion springs of the two button modules extend frontward towards the rear surfaces of the touch portions of the touch elements of the two button modules and then extend outward towards different directions to form two second spring feet, the spring bodies of the torsion springs of the two button modules are worn around the connecting shafts of the two button modules, respectively, the two first spring feet of the torsion springs of the two button modules are disposed in the two notches, respectively, the second spring feet of the torsion springs of the two button modules elastically abut against the top surfaces of the two cantilever arms, respectively.

14. The mouse device as claimed in claim 13, wherein two opposite sides of a top surface of each of the two cantilever arms protrude upward and then bent towards opposite directions to form two L-shaped protruding blocks, the two second spring feet of the torsion spring of one of the two button modules abut against two facing surfaces of the two protruding blocks of the one of the two cantilever arms and two front surfaces of the two protruding blocks of the one of the two cantilever arms facing the rear surfaces of the touch portions of the touch elements of the two button modules, respectively, the two second spring feet of the torsion spring of the other button module abut against two facing surfaces of the two protruding blocks of the other cantilever arm and two front surfaces of the two protruding blocks of the other cantilever arm facing the rear surfaces of the touch elements of the two button modules, respectively.

15. The mouse device as claimed in claim 14, wherein the two facing surfaces of the two L-shaped protruding blocks of the one of the two cantilever arms are disposed between two facing surfaces of the two second fixing portions of the one of the two cantilever arms, the two facing surfaces of the two L-shaped protruding blocks of the other cantilever arm are disposed between two facing surfaces of the two second fixing portions of the other cantilever arm.

16. The mouse device as claimed in claim 11, wherein a front of the top surface of the shell body is recessed inward towards the inside of the shell body to form a locating groove, the fastening groove is located behind the locating groove, a bottom wall of the locating groove opens two pressing holes communicated with the receiving space and arranged transversely, the front of the top surface of the circuit board is equipped with two electronic switches arranged transversely, the fronts of the bottom surfaces of the touch elements of the two button modules protrude downward towards the inside of the shell body to form two pressing portions corresponding to the two electronic switches, respectively, the touch elements of the two button modules are assembled in the locating groove and arranged transversely, the touch elements of the two button modules are located in front of the fastening board, the two pressing portions are received in the two pressing holes, respectively, the touch portion of each of the two button modules is located in the locating groove.

17. The mouse device as claimed in claim 16, further comprising a wheel button assembled on the circuit board, the bottom wall of the locating groove opening a first wheel hole located between the two pressing holes, a junction between the two touch elements of the two button modules opening a second wheel hole corresponding to the first wheel hole, an upper portion of the wheel button being received in the first wheel hole and the second wheel hole and projecting beyond top surfaces of the two touch elements of the two button modules.

* * * * *